(12) United States Patent　　(10) Patent No.: US 12,650,163 B1

Liang　　(45) Date of Patent: Jun. 9, 2026

(54) HARMONIC SPEED REDUCTION TRANSMISSION DEVICE EQUIPPED WITH A STRAIN GAUGE

(71) Applicant: CHONGMO TECHNOLOGY CO., LTD., Kaohsiung City (TW)

(72) Inventor: Hsun-Yao Liang, Kaohsiung City (TW)

(73) Assignee: CHONGMO TECHNOLOGY CO., LTD., Kaohsiung City (TW)

( * ) Notice: Subject to any disclaimer, the term of this patent is extended or adjusted under 35 U.S.C. 154(b) by 0 days.

(21) Appl. No.: 19/233,269

(22) Filed: Jun. 10, 2025

(30) Foreign Application Priority Data

May 16, 2025　(TW) ................................. 114118428

(51) Int. Cl.
| | |
|---|---|
| *F16H 49/00* | (2006.01) |
| *F16H 57/01* | (2012.01) |
| *F16H 57/031* | (2012.01) |
| *H02K 7/116* | (2006.01) |
| *H02K 21/16* | (2006.01) |
| *F16H 57/02* | (2012.01) |

(52) U.S. Cl.
CPC ........... *F16H 49/001* (2013.01); *F16H 57/01* (2013.01); *F16H 57/031* (2013.01); *H02K 7/116* (2013.01); *H02K 21/16* (2013.01); *F16H 2049/003* (2013.01); *F16H 2057/012* (2013.01); *F16H 2057/02026* (2013.01); *F16H 2057/02034* (2013.01); *F16H 2057/02073* (2013.01)

(58) Field of Classification Search
CPC .............................. F16H 49/001; B25J 9/1025
See application file for complete search history.

(56) References Cited

U.S. PATENT DOCUMENTS

| | | | |
|---|---|---|---|
| 8,020,470 B2 * | 9/2011 | Saito ..................... | F16H 49/001 |
| | | | 74/640 |
| 9,855,654 B2 | 1/2018 | Yagi et al. | |
| 12,504,061 B2 * | 12/2025 | Hu ......................... | F16H 49/001 |
| 2024/0337313 A1 * | 10/2024 | Okazaki ............... | F16H 49/001 |

FOREIGN PATENT DOCUMENTS

| | | | | |
|---|---|---|---|---|
| CN | 103610568 B | | 5/2015 | |
| CN | 109895112 B | | 10/2021 | |
| CN | 115683414 B | * 12/2025 | ........... | G01L 5/0042 |
| JP | P5659446 B2 | | 12/2014 | |
| JP | P6496937 B2 | | 3/2019 | |
| TW | I640756 B | | 11/2018 | |
| WO | WO-2010142318 A1 | * 12/2010 | ........... | B25J 9/1025 |
| WO | WO-2021193244 A1 | * 9/2021 | ............ | F16H 57/01 |
| WO | WO-2025196311 A1 | * 9/2025 | ........... | G01L 3/1457 |

* cited by examiner

*Primary Examiner* — William C Joyce

(74) *Attorney, Agent, or Firm* — HDLS IPR SERVICES; Chun-Ming Shih

(57) ABSTRACT

A harmonic speed reduction transmission device equipped with a strain gauge, includes a motor, a harmonic reducer, and a rigid gear assembled in a housing. The motor drives the harmonic reducer to output a rotational torque of reduced speed. The rigid gear is used to guide the harmonic reducer. The rigid gear is formed with at least one bracket that can generate deformation under a bending moment, used to fix the rigid gear inside the housing. The strain gauge is attached on the bracket, used to detect the torque generated by the reduced speed output from the harmonic reducer. Through such a design, the structural configuration of the device is optimized.

11 Claims, 3 Drawing Sheets

HARMONIC SPEED REDUCTION TRANSMISSION DEVICE EQUIPPED WITH A STRAIN GAUGE

BACKGROUND OF INVENTION

1. Field of the Invention

The present invention relates to detection of the torque output from the harmonic speed reduction transmission device, and more particularly to a harmonic speed reduction transmission device equipped with a strain gauge.

2. Description of Related Art

A strain gauge is made of a flexible thin metal sheet (copper foil) that can be deformed under an external force and generate an electric potential signal. In prior-art speed reduction transmission devices, the strain gauge is commonly equipped as a torque sensor for detection and measurement of the torque output from the speed reduction transmission device.

A harmonic speed reduction transmission device is an advanced speed reduction transmission device commonly applied in the elbow joint of industrial robots, humanoid robots, or human limb prosthetics, serving to precisely control the degree of freedom and the output force.

A harmonic speed reduction transmission device generally comprises a harmonic reducer equipped with a motor for power supply. The harmonic reducer outputs rotational torque of reduced speed through the flexible deformation of the metal sheet. Specifically, the harmonic reducer usually includes a rigid gear, a flexible gear, and a wave generator set configured in a housing. The wave generator set includes an elliptical disc and a flexible bearing tightly attached on the periphery of the elliptical disc. The motor can drive the elliptical disc to rotate, and the elliptical disc can sequentially force the flexible bearing and a thin-walled portion of the flexible gear to deform into a consistent elliptical shape. As a result, the flexible gear is enclosed inside the rigid gear and driven to rotate in the opposite direction. During this process, because the number of the external teeth of the flexible gear is slightly less than the internal teeth of the rigid gear, and the thin-walled portion of the flexible gear is already deformed into an elliptical shape, actually only the external teeth on the two opposite ends of the long axis of the ellipse can mesh with the internal teeth of the rigid gear, and rotate slowly on the internal teeth of the rigid gear at the same pitch circle. That means, for every full rotation (360 degrees) of the elliptical disc, the flexible gear can only rotate in the opposite direction for a small arc of the whole circle (360 degrees) (to be determined by the reduced number of the external teeth of the flexible gear). As a result, the rotational speed of the flexible gear is much slower than that of the elliptical disc. Speed reduction is thus realized. Then, rotational torque with a preset reduction ratio is output through a thick-walled portion of the flexible gear.

As known, an existing patent TWI640756B has typically disclosed a technique to install a strain gauge in a planetary gear speed reduction transmission device for detection and measurement of the output torque. However, the strain gauge in the above patent is mounted on a torque sensing disc, and the torque output from the rigid gear (also called ring gear) must be transmitted to the torque sensing disc before it can be detected and measured by the strain gauge. This may reduce the accuracy of measurement of the output torque by the strain gauge.

In addition, existing patents JP-5659446B2 and CN109895122B have typically disclosed the technique of applying the aforementioned harmonic reducer. Patents JP6496937B2, CN109895112B, CN103610568B, and U.S. Pat. No. 9,855,654 even provide methods to install multiple torque sensing components (also called sensors) directly on the movable components that transmit and output the rotational torque of reduced speed. However, the techniques disclosed in the aforementioned patents may easily affect the accuracy of measurement of the torque by the torque sensing components. Moreover, the wires connected to the torque sensing components may rotate along with the movable components, resulting in tangling and damage of the wires.

SUMMARY OF INVENTION

In view of the technical shortcomings in the prior art, the present invention deliberately improves the structure of the speed reduction transmission device so as to avoid mounting the torque sensing component on the movable components and to directly sense the torque output from the rigid gear. In this way, the torque output from the speed reduction transmission device can be detected and measure more accurately, and the wires of the torque sensing components will not be tangled and damaged.

For the above purpose, a preferred embodiment of the present invention uses a strain gauge as the torque sensing component, and provides a harmonic speed reduction transmission device equipped with a strain gauge. The main technical means is to configure a motor, a harmonic reducer, and a rigid gear along a concentric path in a metal housing. Specifically, the motor includes a stator fixed inside the housing and a rotor pivoted inside the stator. The harmonic reducer is connected to the rotor for transmission to output a rotational torque of reduced speed. The rigid gear is fixed inside the housing to guide the harmonic reducer and withstand the torque from the harmonic reducer. Furthermore, the rigid gear is formed with an annular end face with equal radii of circumference. The annular end face extends along the axial path to form at least one bracket that can generate deformation under a bending moment. The rigid gear is fixed inside the housing through the bracket, and the strain gauge is attached on the bracket to detect and measure the torque of reduced speed output from the harmonic reducer.

Based on the above technical means, the present invention differs from the prior art in that: neither the housing nor the rigid gear fixed inside the housing is movable components used to transmit the output rotational torque of reduced speed. Therefore, the present invention can avoid the problem of tangling of the wires of the strain gauge. In addition, in the design of the present invention, while guiding the harmonic reducer to output the rotational torque of reduced speed, the rigid gear will bear the torque, and under the output torque, the bracket will correspondingly generate a deformation with bending moment due to the mechanical property of its metallic material. Consequently, the strain gauge will be deformed along with the bracket and generate an electric potential signal, which can be used to judge the torque generated by the reduced speed output from the harmonic reducer. Specifically, the deformation of the bracket and the strain gauge is proportional to the output torque. Therefore, based on the structural configuration features of the bracket, the present invention can at least enhance the accuracy of sensing the output torque of the harmonic speed reduction transmission device.

In further implementations, the cross section of the bracket can be rectangular, strip-shaped or M-shaped. The bracket can also be formed on the annular end face in a pair. When the cross section of the bracket is implemented as a rectangular shape, the two longer sides of the rectangle are respectively perpendicular to the tangent line of the annular end face, the two shorter sides of the rectangle are respectively parallel to or collinear with the tangent line of the annular end face, and the strain gauge is attached on a radial end face formed by extending either of the longer sides. When the bracket is implemented as a strip shape, the radial end face for attachment of the strain gauge can be formed by extending at least one longer side of the strip shape. Furthermore, when the bracket is implemented as an M shape having two symmetrical strip parts, with each strip part having two symmetrical longer sides, the radial end face for attachment of the strain gauge can be formed by extending either of the longer sides.

In one variable embodiment, the annular end face is formed with a pair of recesses. The bottom of the bracket is respectively formed with a retaining portion that can be fixed inside the recesses. The bracket is formed on the annular end face through the retaining portion. Furthermore, the annular end face can extend along the axial path to form a boss. The recesses are respectively formed between the boss and the annular end face.

Further implementations also include the following:

The housing comprises a housing base and a housing cover pivoted to each other. The rigid gear is fixed inside the housing base of the housing through the bracket, and extends into the housing cover to guide the harmonic reducer. Specifically, the housing base provides fixation for the stator and the rigid gear. The housing cover is used to house the harmonic reducer and provide transmission connection, serving as a power output end of the harmonic speed reduction transmission device.

The harmonic reducer comprises a wave generator set and a flexible gear. The wave generator set comprises an elliptical disc in transmission connection with the rotor and a flexible bearing connected between the elliptical disc and the flexible gear, and the harmonic reducer is guided by the rigid gear through the flexible gear. Specifically, the rigid gear is formed with a plurality of internal teeth distributed in a ring. The flexible gear is formed with a thin-walled portion capable of deformation and a thick-walled portion capable of maintaining rigid strength. The thin-walled portion has a smooth inner wall surface and a plurality of external teeth distributed in a ring on the periphery of the thin-walled portion. The flexible gear is coupled with the flexible bearing through the inner wall surface and engaged with part of the internal teeth of the rigid gear through the external teeth. Furthermore, the housing base provides fixation for the stator and the rigid gear, and the flexible gear is in transmission connection with the housing cover through the thick-walled portion, such that the housing cover becomes a power output end of the harmonic speed reduction transmission device.

In addition, the rotor is formed with a central pivot hole. The housing base is formed with a central seat that can extend into the central pivot hole. The rotor is pivoted between the central seat and the stator through the central pivot hole. The central seat is formed with a seat hole. The housing cover is internally extended to form a central column. The housing cover is pivoted with the housing base through the central column.

Compared to the prior art, the aforementioned technique of the present invention can effectively enhance the accuracy of sensing the output torque and avoid tangling of the wires of the strain gauge. Apart from the above benefits, the invention can enhance the stability and durability of the strain gauge. Furthermore, the invention can help optimize the structural size and internal space of the harmonic speed reduction transmission device.

Further benefits and advantages of the present invention will become apparent after a careful reading of the detailed description with appropriate reference to the accompanying drawings.

DETAILED DESCRIPTION OF THE INVENTION

Figure 1:
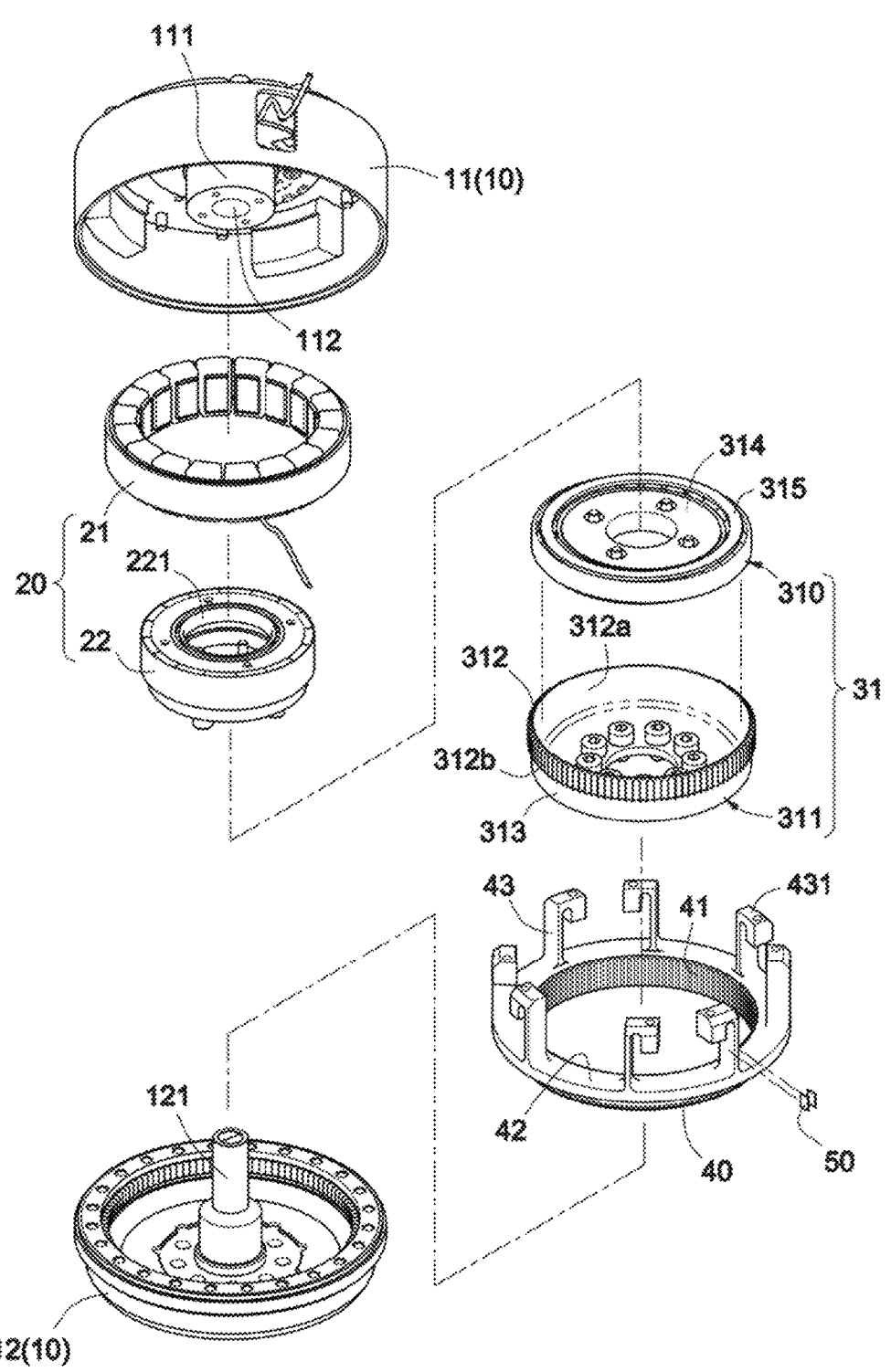
FIG. 1 is an exploded perspective view of the harmonic speed reduction transmission device according to the invention.
Figure 2:
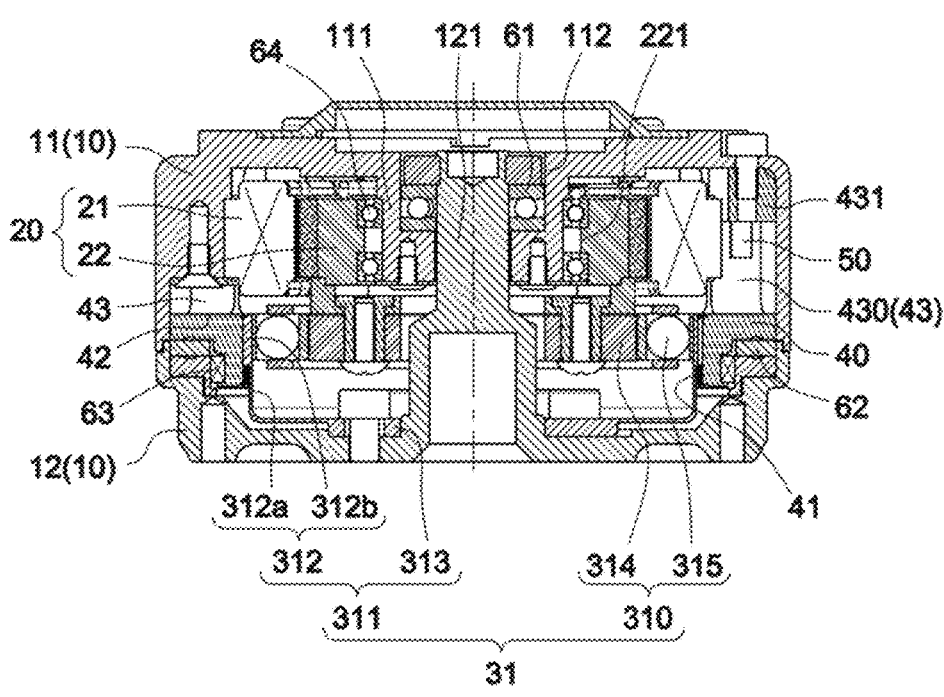
FIG. 2 is a sectional view of FIG. 1.

Firstly, please refer collectively to FIG. 1 and FIG. 2, which disclose the configuration of the first embodiment. As depicted, the harmonic speed reduction transmission device has a housing 10 made of a metallic material. Inside the housing 10, a motor 20, a harmonic reducer 31, a rigid gear 40, and a strain gauge 50 are configured along an axial path. The axial path is represented by a central line in FIG. 2.

The motor 20 can be either a brushless DC motor or a permanent magnetic AC synchronous motor, and comprises a stator 21 fixed inside the housing 10 and a rotor 22 pivoted inside the stator 21, and the rotor 22 is formed with a central pivot hole 221.

The harmonic reducer 31 is in transmission connection with the rotor 22, to convert the rotational torque supplied by the rotor 22 into a rotational torque of reduced speed, and output the rotational torque of reduced speed to the equipment end of the harmonic speed reduction transmission device.

The harmonic reducer 31 comprises a wave generator set 310 and a flexible gear 311. Specifically, the wave generator set 310 comprises an elliptical disc 314 in transmission connection with the rotor 22 and a flexible bearing 315 coupled between the elliptical disc 314 and the flexible gear 311. In addition, the flexible gear 311 is formed with a thin-walled portion 312 capable of deformation and a thick-walled portion 313 capable of maintaining rigid strength. The thin-walled portion 312 has a smooth inner wall surface 312*a* and a plurality of external teeth 312*b* distributed in a ring on the periphery of the thin-walled portion 312. The flexible gear 311 can be coupled with the flexible bearing 315 through the inner wall surface 312*a*.

The rigid gear 40 is made of a rigid metallic material and has a plurality of internal teeth 41 distributed in a ring. The rigid gear 40 is also fixed inside the housing 10 along the axial path. In this way, the plurality of external teeth 312*b* of the flexible gear 311 can mesh with part of the internal teeth 41 of the rigid gear 40, such that the rigid gear 40 can guide the flexible gear 311 of the harmonic reducer 31.

In addition, the rigid gear 40 is formed with an annular end face 42 of equal radii in circle, the annular end face 42 extends along the axial path to form a pair of flexible brackets 43, such that the rigid gear 40 can be fixed inside the housing 10 through the brackets 43. Specifically, it is not necessary that the bracket 43 is in a pair. Actually, it is to be understood that, as long as one or a plurality of brackets 43 are formed on the annular end face 42, such varied designs all fall within the application scope of the present invention. Further referring to FIG. 3*a*, the bracket 43 is integrally formed on the annular end face 42 in an upright form, and one end of the bracket 43 is formed with a joining portion 431. The bracket 43 can be fixed on a top wall of the housing 10 by fastening a screw through the joining portion 431.

Referring to FIG. 1 and FIG. 2 again, the strain gauge 50 can be fixed on the bracket 43 by means of attachment. Furthermore, the strain gauge 50 is made of a flexible copper foil into the shape of a strip. When pulled, compressed, or twisted by an external force, it can be deformed and generate an electric potential signal, and the deformation of the strain gauge 50 under the external force is proportional to the output torque. In other words, a stronger external force will cause larger deformation of the strain gauge 50, and consequently a larger value of the output torque displayed by the electric potential signal, and vice versa. In addition, the bracket 43 is formed with at least one radial end face 430. The radial end face 430 refers to the radial plane surface located on the rigid gear 40. The strain gauge 50 is attached on the radial end face 430 of the bracket 43, and is thus integrated with the bracket 43.

Based on the configuration technique disclosed in the first embodiment, through the electric potential signal generated by the strain gauge 50, the present invention can use a common logic controller to read and judge the torque generated by the reduced speed output from the harmonic reducer 31.

To be more specific, as shown in FIG. 2, when the stator 21 of the motor 20 excites the rotor 22 to rotate, it will drive the elliptical disc 314 to rotate, and sequentially force the flexible bearing 315 and the thin-walled portion 312 of the flexible gear 311 to deform into a consistent elliptical shape. Consequently, the flexible gear 311 is enclosed inside the rigid gear 40 and rotates in the opposite direction. Now, because the number of the external teeth 312*b* of the flexible gear 311 is less than the internal teeth 41 of the rigid gear 40 (usually two teeth less), and the thin-walled portion 312 of the flexible gear 311 has already deformed into an elliptical shape, actually only the external teeth 312*b* on the two opposite ends of the longer axis of the ellipse shape of the flexible gear 311 can mesh with part of the internal teeth 41 of the rigid gear 40, and rotate slowly on the internal teeth 41 of the rigid gear 40 at the same pitch circle.

In other words, every time the rotor 22 drives the elliptical disc 314 to have a full rotation (360 degrees), the flexible gear 311 will be driven to rotate a small arc of the circle (360 degrees) (to be determined by the reduced number of the flexible gear external teeth), i.e., the rotational speed of the flexible gear 311 is relatively slower than the rotational speed generated by the rotor 22. In this way, harmonic speed reduction is realized, and through the flexible gear 311, the harmonic reducer 31 can output rotational torque of reduced speed of a preset reduction ratio. During this process of speed reduction transmission, apart from guiding the flexible gear 311, the rigid gear 40 also bears the torque transmitted from the flexible gear 311.

Figure 3A:
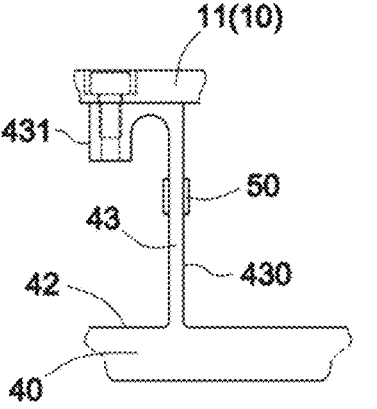
FIG. 3*a* is a partial sectional view of FIG. 2, depicting the configuration of the bracket on the rigid gear and the strain gauge attached on the bracket.
Figure 3B:
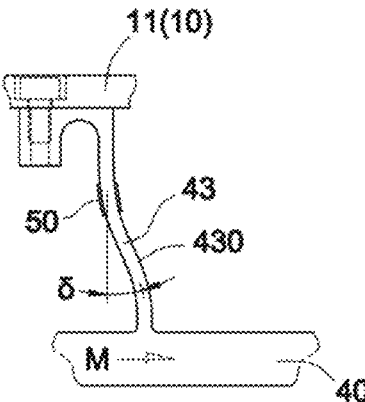
FIG. 3*b* is an operational view of FIG. 3*a*, explaining how the strain gauge is deformed along with the bracket to sense the torque.

Now please further refer to FIG. 3*a* to FIG. 3*b*. Specifically, in FIG. 3*a*, when the rigid gear 40 has not received the torque, the bracket 43 and the strain gauge 50 are not deformed, and the strain gauge 50 does not generate the electric potential signal. In FIG. 3*b*, when the rigid gear 40 receives the torque M transmitted from the flexible gear 311, the bracket 43 will generate a deformation & under action of the bending moment. Now, the strain gauge 50 fixed on the radial end face 430 of the bracket 43 will deform along with the bracket 43, and the larger the torque M received by the rigid gear 40 from the flexible gear 311, the larger deformation & the bracket 43 and the strain gauge 50 will generate, and consequently stronger electric potential signal the strain gauge 50 will generate, and vice versa. Therefore, based on the strength of the electric potential signal, the present invention can read and judge the torque generated by the reduced speed.

Figure 3C:
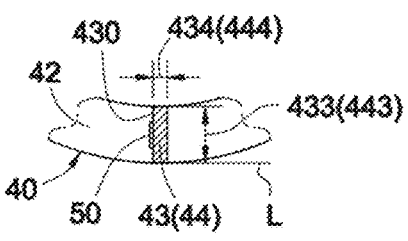
FIG. 3*c* is a sectional view of the bracket disclosed in FIG. 3*a*.

Further referring to FIG. 3*c*, the cross section of the middle portion of the bracket 43 disclosed in FIG. 1 forms a rectangle enclosed by two longer sides 433 and two shorter sides 434. The two longer sides 433 are respectively perpendicular to the tangent line L of the annular end face 42, and the two shorter sides 434 are respectively parallel to or collinear with the tangent line L of the annular end face 42. Through the relative thinness formed by the two shorter sides 434, the bracket 43 having a rectangular cross section can generate a deformation under a bending moment. Specifically, the radial end face 430 can be formed by extending either of the two longer sides 433. Alternatively, the radial end face 430 can be formed by extending both of the two longer sides 433 symmetrically. Furthermore, the longer sides 433 extend along the radial and axial paths of the rigid gear 40 to form the radial end face 430. Moreover, the strain gauge 50 can be fixed on the bracket in a single configuration, or as shown in FIG. 3*a*, in paired configuration. As known, more strain gauges 50 will mean higher accuracy of detection and measurement of the torque of the reduced speed output from the harmonic reducer 31.

In addition, the bracket 43 disclosed in FIG. 1 and FIG. 3*c* can also be in a strip shape. The strip shape also has the two longer sides 433 and the two shorter sides 434, and the radial end face 430 disclosed in FIG. 2, FIG. 3*a*, and FIG. 3*b* can also be formed by extending either of the two longer sides 433 or both of the longer sides symmetrically, for attachment of the strain gauge 50.

Figure 3D:
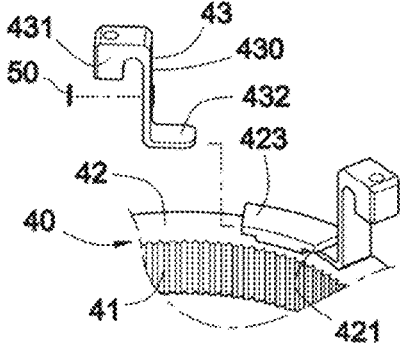
FIG. 3*d* is a perspective view of the bracket and rigid gear in FIG. 3*a* implemented as separate structures.

Further referring to FIG. 3*d*, the bracket 43 disclosed in FIG. 1 can be fixed on the annular end face 42 in an upright and detachable form. Moreover, the annular end face 42 is formed with a pair of recesses 421. The bottom of the bracket 43 is respectively formed with a retaining portion 432 that can fit into and fixed inside the recess 421, such that, through the retaining portion 432, the bracket 43 can be mounted inside the recess 421 of the annular end face 42, and thus be configured on the annular end face 42. In this way, the manufacturing process of the rigid gear 40 can be simplified.

Figure 4A:
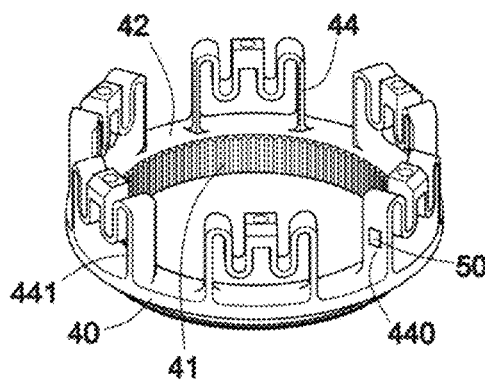
FIG. 4*a* is an exploded perspective view of another embodiment with the bracket formed on the rigid gear shown in FIG. 2.

FIG. 4*a* discloses another type of bracket 44 located between the annular end face 42 and the housing 10, i.e., the bracket 44 can be formed in an M shape with flexibility. The M shape has two symmetrical strip parts 441. Each strip part

441 has two symmetrical longer sides 443 and two shorter sides 444 (see FIG. 3*c*), such that the bracket 44 can generate deformation under a bending moment through the relative thinness formed by the two shorter sides 444. Specifically, the radial end face 440 can be formed by extending either of the two longer sides 443 shown in FIG. 4*a*, or by extending both of the longer sides symmetrically, such that the strain gauge 50 can be attached on at least one radial end face 440 formed by extending either of the longer sides or both of the longer sides symmetrically.

Figure 4B:
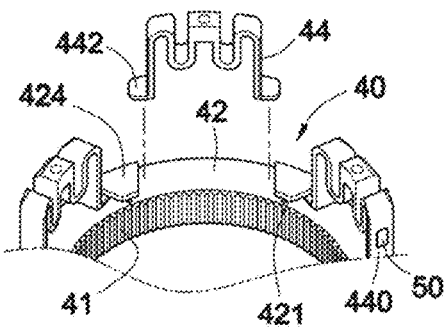
FIG. 4*b* is a perspective view of another embodiment with the bracket formed on the rigid gear shown in FIG. 2, showing the bracket and the annular end face are configured in a detachable form.

Further referring to FIG. 4*b*, the bracket 44 disclosed in FIG. 4*a* can be fixed on the annular end face 42 in a detachable and upright form. Moreover, the annular end face 42 is formed with a pair of recesses 421. The bottom of the bracket 44 is respectively formed with a retaining portion 442 that can be fixed inside the recess 421, such that, through the retaining portion 442, the bracket 44 can be mounted in the recesses 421 of the annular end face 42 and thus be configured on the annular end face 42. In this way, the manufacturing process of the rigid gear 40 can also be simplified.

The above first embodiment further discloses that the housing 10 can be in a ring shape, comprising a ring-shaped housing base 11 and a ring-shaped housing cover 12 pivoted to each other. Furthermore, as shown in FIG. 1 and FIG. 2, the housing base 11 can be regarded as the fixing end of the transmission device, such that it can be fastened on the equipment end requiring the rotational torque of reduced speed. The center of the housing base 11 can be formed with a central seat 111. The central seat 111 is configured with a seat hole 112, and the center of the housing cover 12 is formed with a central column 121 that can extend into the seat hole 112, such that a first bearing 61 can be fitted between the seat hole 112 and the central column 121. In addition, between the peripheries of the housing base 11 and the housing cover 12, a second bearing 62 and a third bearing 63 are mounted. Thus, through the central column 121, the first bearing 61, the second bearing 62, and the third bearing 63, the housing cover 12 can be pivoted to the housing base 11.

In addition, through the housing base 11, the housing 10 provides fixation for the stator 21 and the rigid gear 40. Through at least one fourth bearing 64 configured inside the central pivot hole 221, the rotor 22 can be pivoted between the outer wall of the central seat 111 and the stator 21. The housing cover 12 provides fixation for the thick-walled portion 313 of the flexible gear 311, such that, by using the housing cover 12 as a power output end, the rotational torque of reduced speed output from the flexible gear 311 can be supplied to the equipment end.

The central seat 111 and seat hole 112 formed inside the housing base 11 as described above can also be formed inside the housing cover 12. In this case, the central column 121 of the housing cover 12 is formed inside the housing base 11. In other words, as long as the housing base 11 and the housing cover 12 can be pivoted to each other and have interconnected internal holding chambers, any variation falls within the scope of the invention.

According to the descriptions of the above embodiments, the present invention can substantially enhance the accuracy of sensing the torque output from the harmonic speed reduction transmission device, and can overcome the problem of tangling of the torque sensing components. It is to be noted that the above embodiments are used only for describing preferred implementations of the present invention, and are not intending to limit the patent scope. Therefore, the scope of the present invention shall be defined by the content of the claims specified in the patent application.

The invention claimed is:

1. A harmonic speed reduction transmission device equipped with a strain gauge, comprising the following components configured inside a housing along an axial path:

a motor, including a stator fixed inside the housing and a rotor pivoted inside the stator;

a harmonic reducer, in transmission connection with the rotor to output a rotational torque of reduced speed;

a rigid gear, fixed inside the housing to guide the harmonic reducer, and to withstand the torque from the harmonic reducer; wherein, the rigid gear is formed with an annular end face of equal radii in the same pitch circle, the annular end face extends along the axial path to form at least one bracket that can generate deformation under a bending moment, the rigid gear is fixed inside the housing through the bracket, and the strain gauge is attached on the bracket to sense the torque generated by the reduced speed output from the harmonic reducer;

wherein said annular end face is formed with a pair of recesses corresponding to the brackets, the bottom of each bracket is respectively formed with a retaining portion that can be fixed inside the recess, and the bracket is formed on the annular end face through the retaining portion;

wherein said annular end face extends along the axial path to form a boss, with the recesses respectively formed between the boss and the annular end face.

2. The harmonic speed reduction transmission device equipped with a strain gauge defined in claim 1, wherein said bracket has a rectangular cross section, the two longer sides of the rectangle are respectively perpendicular to the tangent line of the annular end face, the two shorter sides of the rectangle are respectively parallel to or collinear with the tangent line of the annular end face, and the strain gauge is attached on a radial end face formed by extending either of the longer sides.

3. The harmonic speed reduction transmission device equipped with a strain gauge defined in claim 1, wherein said bracket is strip-shaped, located between the annular end face and the housing, at least one longer side of the strip shape is extended to form a radial end face, and the strain gauge is attached on the radial end face.

4. The harmonic speed reduction transmission device equipped with a strain gauge defined in claim 1, wherein said bracket is formed on the annular end face in a pair.

5. The harmonic speed reduction transmission device equipped with a strain gauge defined in claim 1, wherein said housing comprises a housing base and a housing cover pivoted to each other, the rigid gear is fixed inside the housing base of the housing through the bracket, and extends into the housing cover to guide the harmonic reducer.

6. The harmonic speed reduction transmission device equipped with a strain gauge defined in claim 1, wherein said housing comprises a housing base and a housing cover pivoted to each other, the housing base provides fixation for the stator and the rigid gear, the housing cover is used to house the harmonic reducer and provide transmission connection, serving as a power output end of the harmonic speed reduction transmission device.

7. The harmonic speed reduction transmission device equipped with a strain gauge defined in claim 1, wherein said harmonic reducer comprises a wave generator set and a flexible gear, the wave generator set comprises an elliptical disc in transmission connection with the rotor and a flexible bearing connected between the elliptical disc and the flexible gear, and the harmonic reducer is guided by the rigid gear through the flexible gear.

8. The harmonic speed reduction transmission device equipped with a strain gauge defined in claim 7, wherein said flexible gear is formed with a thin-walled portion capable of deformation and a thick-walled portion capable of maintaining rigid strength, the thin-walled portion has a smooth inner wall surface and a plurality of external teeth distributed in a ring on the periphery of the thin-walled portion, the flexible gear is coupled with the flexible bearing through the inner wall surface and engaged with part of the internal teeth of the rigid gear through the external teeth.

9. The harmonic speed reduction transmission device equipped with a strain gauge defined in claim 8, wherein said housing comprises a housing base and a housing cover pivoted to each other, the housing base provides fixation for the stator and the rigid gear, the flexible gear is in transmission connection with the housing cover through the thick-walled portion, such that the housing cover becomes a power output end of the harmonic speed reduction transmission device.

10. The harmonic speed reduction transmission device equipped with a strain gauge defined in claim 1, wherein said rotor is formed with a central pivot hole, the housing comprises a housing base and a housing cover pivoted to each other, the housing base is formed with a central seat that can extend into the central pivot hole, the rotor is pivoted between the central seat and the stator through the central pivot hole, the central seat is formed with a seat hole, the housing cover is internally extended to form a central column, and the housing cover is pivoted with the housing base through the central column.

11. A harmonic speed reduction transmission device equipped with a strain gauge, comprising the following components configured inside a housing along an axial path:

a motor, including a stator fixed inside the housing and a rotor pivoted inside the stator;

a harmonic reducer, in transmission connection with the rotor to output a rotational torque of reduced speed;

a rigid gear, fixed inside the housing to guide the harmonic reducer, and to withstand the torque from the harmonic reducer; wherein, the rigid gear is formed with an annular end face of equal radii in the same pitch circle, the annular end face extends along the axial path to form at least one bracket that can generate deformation under a bending moment, the rigid gear is fixed inside the housing through the bracket, and the strain gauge is attached on the bracket to sense the torque generated by the reduced speed output from the harmonic reducer;

wherein said bracket is M-shaped, located between the annular end face and the housing, said M shape has two symmetrical strip parts, each strip part has two symmetrical longer sides, and the strain gauge is attached on a radial end face formed by extending either of the longer sides.

* * * * *